May 7, 1963  T. S. BUSBY ETAL  3,088,898
CONTROL ROD MATERIALS
Filed Dec. 24, 1958
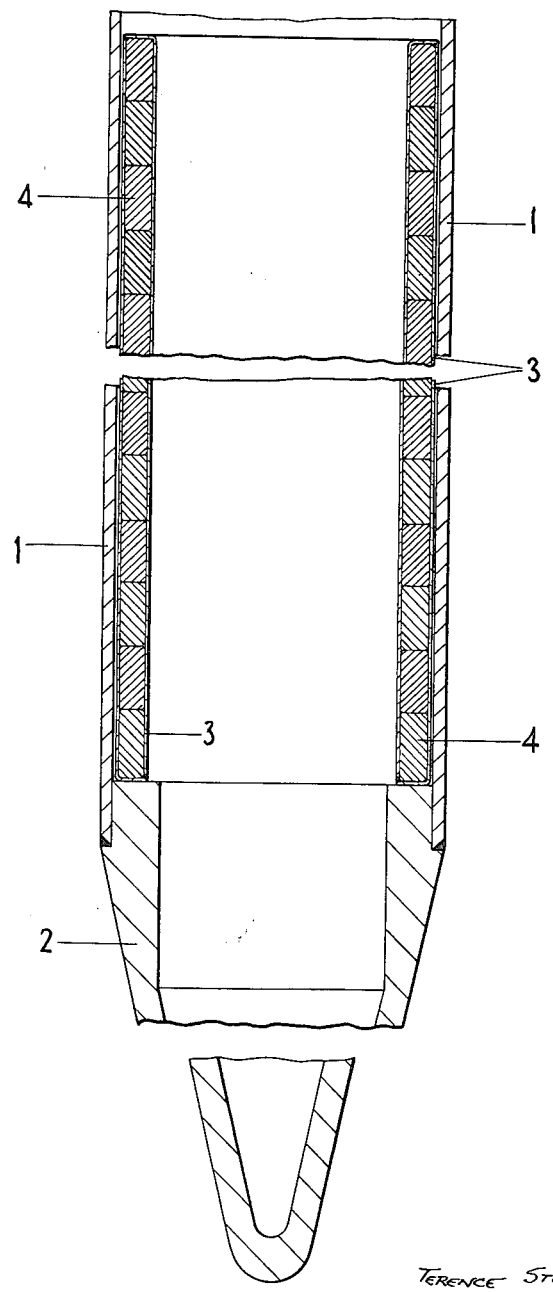
INVENTORS
TERENCE STANLEY BUSBY
MERVIN WYNDHAM DAVIES
BY Kirschstein, Kirschstein & Ottinger
ATTORNEYS

# United States Patent Office 3,088,898
Patented May 7, 1963

3,088,898
CONTROL ROD MATERIALS
Terence Stanley Busby and Mervin Wyndham Davies, London, England, assignors to The General Electric Company Limited, London, England
Filed Dec. 24, 1958, Ser. No. 782,931
Claims priority, application Great Britain Jan. 6, 1958
13 Claims. (Cl. 204—193.2)

This invention relates to control rod materials, that is to say materials suitable for use in the control rods of a nuclear reactor. For the purposes of the present specification, a control rod is to be taken to mean any control element containing material of high neutron capture cross-section such that movement of the rod with respect to the core of a nuclear reactor causes a change in the reactivity of the reactor, and control rod material is to be understood accordingly.

For some applications, e.g. in high temperature gas-cooled nuclear reactors, it is also necessary that the control rod material should be able to withstand elevated temperatures without substantial corrosion or pollution of the reactor coolant, and it is an object of the present invention to provide a control rod material suitable for such applications.

According to the present invention, a control rod material comprises a ceramic formed from an element or compound having a high neutron capture cross-section in association with one or more of the oxides of magnesium, calcium, aluminium or silicon.

According to a preferred form of the present invention, a control material comprises a ceramic formed from boron oxide in association with one or more of the oxides of magnesium, calcium, aluminium or silicon; it is preferable that the number of atoms of boron falls substantially within the range 12 to 35% of the total number of atoms present in the material.

The composition of a ceramic in accordance with the present invention will be determinable by experiment, as will be evident to those skilled in the art. But it is essential that the said element or compound, such as boron oxide, should be combined in a non-volatile form and that it should not be convertible to a non-stable form by irradiation in the reactor in which it is intended to be used for control.

The ceramic may be formed by mixing together the associated element or compound, such as boron oxide, and the one or more oxides of magnesium, calcium, aluminium or silicon, pressing the mixture to shape and sintering. It will be evident that the best method of forming the mixture will be by means of powders.

Alternatively the ceramic may be formed by heating together the ingredients to form a molten mass which is subsequently cooled to a solid which may be a casting of a particular shape. In this way it may be more practicable to make a control rod which is of high strength so that it can be made largely self-supporting if required. We do not, however, rule out the possibility of a sintered material being strong enought for this purpose, and in fact a satisfactory material may be obtained by crushing a solid formed by melting, pressing the resulting powder to shape and sintering.

We wish it to be understood that the derivation of a ceramic in accordance with the invention need not be by a straightforward process. Thus if more than one oxide is involved in the formation of the ceramic, it may be preferable or even desirable, especially in the case of the oxide of aluminium, to form the ceramic from the combination of more than one association of an oxide and the said element or compound; or even from the combination of two materials, one of which may be made from the association of part of the quantity of the one oxide with the other oxide and the other being made from the association of the remaining constituents. When possible however it will obviously be an advantage to complete the formation of the ceramic in the simplest manner.

One example of control rod comprising a ceramic material in accordance with the invention will now be described by way of example with reference to the accompanying sectional drawing.

In the drawing, a relatively thin-walled tube 1 of stainless steel forms the control rod sleeve, and the lower end is terminated by a cap 2 welded to the sleeve. Arranged for support by the inner end of the cap 2 is a stainless steel casing 3 of hollow, possibly vented, annular construction. A number of annular units 4 of ceramic material are stacked one above the other, substantially to fill this casing. The casing may be of the same height as the effective length required for the control rod, or a plurality of casings may be provided as a stack within the sleeve 1. The effective part of the control rod is in this case, therefore, hollow.

The requirements for strength of the material of the units 4 and the length of the casings 3 will be governed by the total height of the stacks. Care has, for instance, to be taken that the lower units are not crushed by the pressure of the upper units, especially in view of the rapid deceleration of a control rod when operated under emergency conditions.

It appears that an assembly of annular units, each about 2½ inches outside diameter and ¼ inch wall, can be made up to about 60 in a stack, in the material described below. Further casings would be arranged one above the other to the full effective height.

The units are made from powdered ceramic which is composed of the oxides of magnesium, boron and silicon substantially in the molecular ratio of 20:9:1. This ceramic is obtained by rapid melting of ingredients to give the final ratio and for this purpose, the melting point of a material of this composite being about 1340° C., the temperature of the crucible is maintained at about 1400° C. The melt solidifies after extraction from the furnace and is crushed to a fine powder which can be compacted under pressure to take the form of annuli. Sintering these compacts at about 1300° C. results in the units 4. The ideal form of the powder, that is degree of fineness and particle size will be readily found by trial to give the best possible strength. It may be found sufficient to sinter at about 1100° C.

For smaller applications, it is envisaged that a control rod may be prepared by forming a solid rod of cast or sintered ceramic of suitable composition, such as those described above.

By way of further examples, satisfactory control rod materials have been formed from the binary mixtures of magnesium oxide with boron oxide, or calcium oxide with boron oxide, the concentration of boron in each case falling within the range 12 to 35 atom percent. Part of the boron oxide in these binary mixtures may be replaced by either or both of the oxides of silicon and aluminium. Ternary mixtures of magnesium oxide, calcium oxide and boron oxide yield suitable materials provided that the concentration of boron falls within the specified range. The calcium oxide or magnesium oxide in some of these binary and ternary mixtures may be replaced in part or wholly by aluminium oxide. Finally, part of the boron oxide in the ternary mixture of magnesium oxide, calcium oxide and boron oxide may be replaced by silica. Care would normally have to be taken that the mixtures should not give rise to a product containing boron in a non-combined form.

Except perhaps from the point of expense, it would appear that oxides of gadolinium and europium may be used as alternative compounds of high neutron capture cross-section.

We claim:

1. A control rod for a nuclear reactor composed of a ceramic material consisting essentially of, in stable combination, an oxide of a metal of the group consisting of boron, gadolinium and europium, and at least one oxide of the group consisting of magnesium oxide and calcium oxide.

2. A control rod in accordance with claim 1 wherein the said ceramic material includes also the oxide of one of the group of metals which consists of silicon and aluminum.

3. A control rod for a nuclear reactor comprising at least one sheath of temperature- and corrosion-resistant material and a plurality of unit pieces of a material as set forth in claim 1 located in series within said sheath.

4. A control rod for a nuclear reactor as claimed in claim 3 wherein a plurality of unit-containing sheaths are arranged end-to-end within an outer container.

5. A control rod for a nuclear reactor as claimed in claim 3 wherein said unit pieces are of annular form arranged in series to form a substantially continuous hollow cylinder.

6. A control rod for a nuclear reactor as claimed in claim 4 wherein said sheaths and said container are of stainless steel.

7. A control rod for a nuclear reactor comprising a sleeve-shaped structural member having abutment positioning means adjacent one end and at least one body of neutron absorbing material located within said sleeve and abutting against said means, said material consisting of essentially a ceramic, that is a crystalline compound of boron oxide in stable combination with at least one oxide of the group of oxides including magnesia and calcium oxide, the total number of atoms of boron in the material falling substantially in the range of 12 to 35 percent of the total number of atoms present in the material.

8. A control rod for a nuclear reactor comprising a sleeve-shaped structural member having abutment positioning means adjacent one end and an annular cylindrical double-walled sheath located within said sleeve and abutting against said means, said sheath having disposed within it a plurality of annular cylindrical bodies of neutron absorbing material arranged end to end, said material consisting of essentially a ceramic, that is a crystalline compound of boron oxide in stable combination with at least one oxide of the group of oxides including magnesium and calcium oxide, the total number of atoms of boron in the material falling substantially in the range of 12 to 35 percent of the total number of atoms present in the material.

9. A control rod for use in a nuclear reactor cooled by carbon dioxide, said control rod being composed of a ceramic material consisting essentially of, in combination, boron oxide and the oxide of at least one of the metals of the group consisting of magnesium and calcium, said combination being stable in relation to carbon dioxide at elevated temperatures, and the total number of boron atoms in said material falling substantially within the range of 12 to 35 percent of the total number of atoms present in the material.

10. A control rod according to claim 9 wherein the said ceramic material includes also the oxide of one of the metals of the group consisting of silicon and aluminum.

11. A material consisting essentially of a ceramic, that is a crystalline compound of oxides of magnesium, boron and silicon substantially in the molecular ratio of 20:9:1.

12. A control rod for a nuclear reactor containing a material as claimed in claim 11.

13. A control rod for a nuclear reactor comprising at least one sheath of temperature- and corrosion-resistant material containing a plurality of unit pieces of neutron absorbing material located in series within the sheath, said material being as set forth in claim 11.

References Cited in the file of this patent

UNITED STATES PATENTS

| | | |
|---|---|---|
| 2,063,329 | Morrison | Dec. 8, 1936 |
| 2,106,578 | Schwartzwalder et al. | Jan. 25, 1938 |
| 2,660,532 | Melnick et al. | Nov. 24, 1953 |
| 2,693,668 | Slayter | Nov. 9, 1954 |
| 2,856,303 | Armistead | Oct. 14, 1958 |
| 2,859,163 | Ploetz | Nov. 4, 1958 |
| 2,866,741 | Hausner | Dec. 30, 1958 |

FOREIGN PATENTS

| | | |
|---|---|---|
| 1,175,249 | France | Nov. 10, 1958 |